(12) United States Patent
Florian et al.

(10) Patent No.: US 9,794,665 B2
(45) Date of Patent: Oct. 17, 2017

(54) SYSTEM AND METHOD FOR A TRANSDUCER INTERFACE

(71) Applicant: Infineon Technologies AG, Neubiberg (DE)

(72) Inventors: Wilfried Florian, Villach (AT); Andreas Wiesbauer, Poertschach (AT); Richard Gaggl, Poertschach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/139,892

(22) Filed: Apr. 27, 2016

(65) Prior Publication Data

US 2016/0241943 A1 Aug. 18, 2016

Related U.S. Application Data

(63) Continuation of application No. 14/060,391, filed on Oct. 22, 2013, now Pat. No. 9,357,295.

(51) Int. Cl.
| | | |
|---|---|---|
| H04R 3/00 | (2006.01) |
| H04R 1/04 | (2006.01) |
| G06F 3/16 | (2006.01) |
| H04R 25/00 | (2006.01) |

(52) U.S. Cl.
CPC .............. *H04R 1/04* (2013.01); *G06F 3/162* (2013.01); *H04R 3/00* (2013.01); *H04R 25/00* (2013.01); *H04R 2201/003* (2013.01); *H04R 2410/00* (2013.01); *H04R 2420/01* (2013.01)

(58) Field of Classification Search
CPC .............. H04R 1/04; H04R 2201/003; H04R 2410/00; H04R 25/00; H04R 3/00; G06F 3/162
See application file for complete search history.

(56) References Cited

U.S. PATENT DOCUMENTS

| | | | |
|---|---|---|---|
| 5,579,397 | A | 11/1996 | Ikeda et al. |
| 5,796,850 | A | 8/1998 | Shiono et al. |
| 2006/0044062 | A1 | 3/2006 | Kojima et al. |
| 2010/0303046 | A1 | 12/2010 | Braithwaite et al. |
| 2012/0112718 | A1 | 5/2012 | Pons |
| 2012/0224726 | A1 | 9/2012 | Pahl et al. |
| 2013/0272532 | A1 | 10/2013 | Mazanec |
| 2015/0016636 | A1 | 1/2015 | Florian et al. |

FOREIGN PATENT DOCUMENTS

| | | |
|---|---|---|
| JP | 07212148 A | 8/1995 |
| JP | 2011193144 A | 9/2011 |
| KR | 20060050639 A | 5/2006 |

OTHER PUBLICATIONS

Sonion, "Application Note—Two-Wire Microphones," Version 002, Jun. 11, 2012, pp. 1-8.

*Primary Examiner* — Regina N Holder
(74) *Attorney, Agent, or Firm* — Slater Matsil, LLP

(57) ABSTRACT

According to an embodiment, an interface circuit includes a current replicator and a receiver. The current replicator includes a power terminal coupled to a first reference node, an output terminal configured to output a signal proportional to a signal received from a transducer, and an interface terminal coupled to the transducer. Using a single interface terminal, the current replicator may be configured to provide power to the transducer and receive output signals from the transducer. The receiver may include a first input terminal coupled to the output terminal, a second input terminal coupled to a second reference node, and a current converter circuit coupled to the first input terminal.

28 Claims, 7 Drawing Sheets

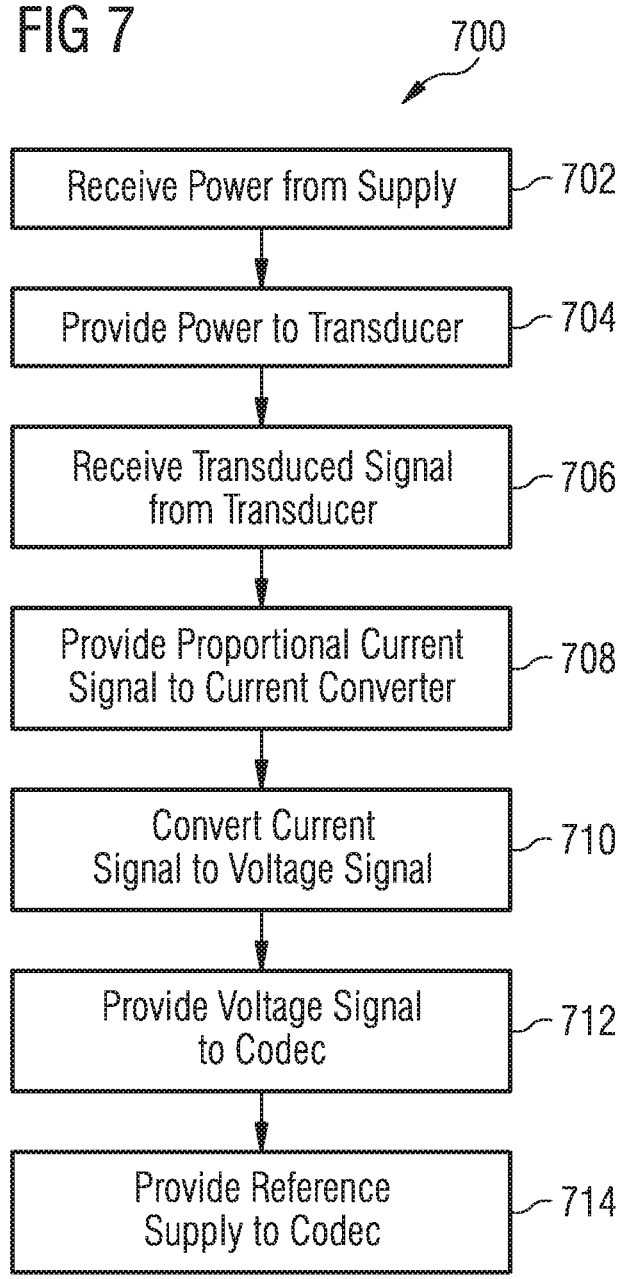

SYSTEM AND METHOD FOR A TRANSDUCER INTERFACE

This is a Continuation application of U.S. application Ser. No. 14/060,391, entitled "System and Method for a Transducer Interface" which was filed on Oct. 22, 2013 and is incorporated herein by reference.

TECHNICAL FIELD

The present invention relates generally to transducer systems, and, in particular embodiments, to a system and method for a transducer interface.

BACKGROUND

Audio microphones are commonly used in a variety of consumer applications such as cellular telephones, digital audio recorders, personal computers and teleconferencing systems. In particular, lower-cost electret condenser microphones (ECM) are used in mass produced cost sensitive applications. An ECM microphone typically includes a film of electret material that is mounted in a small package having a sound port and electrical output terminals. The electret material is adhered to a diaphragm or makes up the diaphragm itself.

Another type of microphone is a microelectromechanical systems (MEMS) microphone, in which a pressure sensitive diaphragm is etched directly onto an integrated circuit. As such, the microphone is contained on a single integrated circuit rather than being fabricated from individual discrete parts.

Most ECM and MEMS microphones also include a preamplifier that can be interfaced to an audio front-end amplifier via a cord and plug for a target application such as a cell phone or a hearing aid. In many cases, the interface between the preamplifier and front-end amplifier is a three-wire interface coupled to a power terminal, signal terminal and ground terminal. In some systems, however, a two-wire interface is used in which two of the terminals are combined into a signal, thereby reducing the cost of the system by using two wires instead of three wires.

For all types of transducers, and microphones in particular, designing electronic interfaces can be challenging. Combining a power and signal interface into a single interface poses a number of particular design challenges with respect to voltage swing and low supply voltage use, among others. Increasing voltage swing in a transducer generally increases the range of the transducer. Lowering the supply voltage is usually associated with decreasing the power consumption and is often relevant in mobile applications. In some instances, lowering the supply voltage, however, may have an adverse impact on the voltage swing.

SUMMARY OF THE INVENTION

According to an embodiment, an interface circuit includes a current replicator and a receiver. The current replicator includes a power terminal coupled to a first reference node, an output terminal configured to output a signal proportional to a signal received from a transducer, and an interface terminal coupled to the transducer. Using a single interface terminal, the current replicator may be configured to provide power to the transducer and receive output signals from the transducer. The receiver may include a first input terminal coupled to the output terminal, a second input terminal coupled to a second reference node, and a current converter circuit coupled to the first input terminal.

BRIEF DESCRIPTION OF THE DRAWINGS

For a more complete understanding of the present invention, and the advantages thereof, reference is now made to the following descriptions taken in conjunction with the accompanying drawing, in which:

FIG. 7 illustrates a block diagram of an embodiment method of operation.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely microphone transducers, and more particularly, microphone interface circuits. Some of the various embodiments described herein include transducer systems, microphone systems, interface circuits for transducer and MEMS transducer systems, and two wire and three wire transducer interfaces. In other embodiments, aspects may also be applied to other applications involving any type of sensor or transducer interfacing with electronics according to any fashion as known in the art.

According to various embodiments described herein, a transducer system includes a current replicator coupled to a transducer and a codec. The current replicator supplies power and receives transduced signals on a single coupling between the current replicator and the transducer. The current replicator also supplies a replicated current signal, proportional to the transduced signal, to a current converter circuit coupled to the codec. In some embodiments, the current converter circuit converts the replicated current signal to a voltage signal and supplies the voltage signal to the codec.

Figure 1:
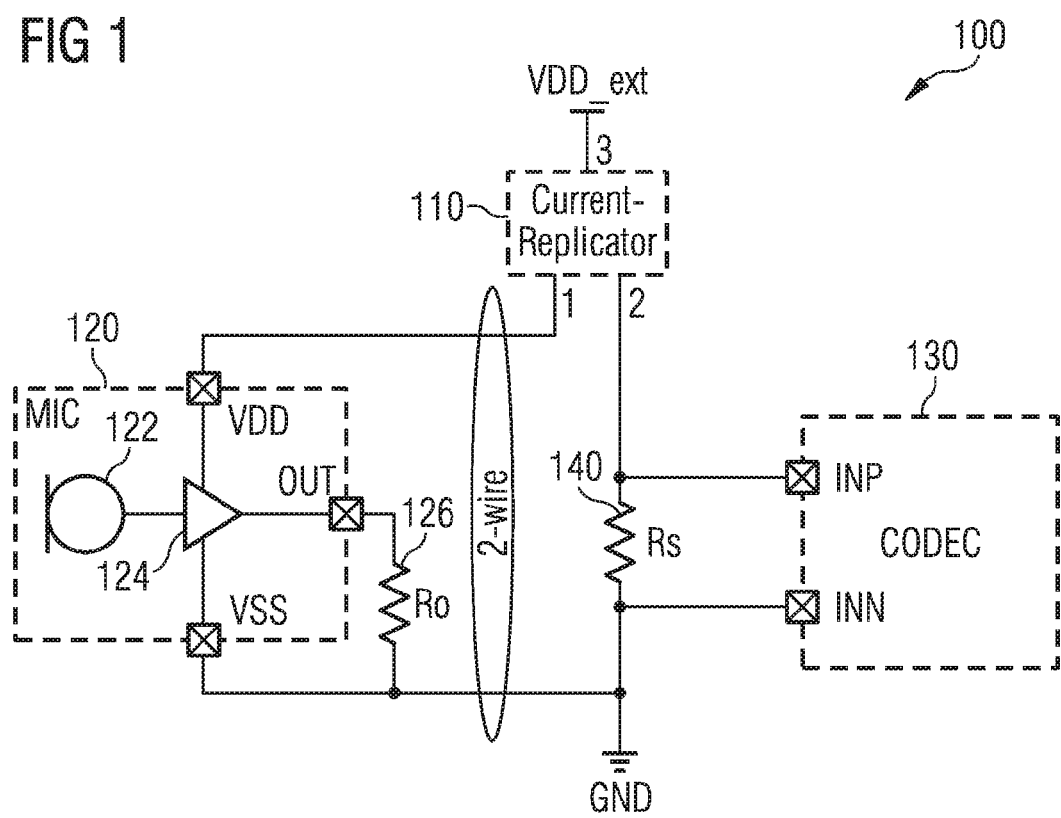
FIG. 1 illustrates a block diagram of an embodiment microphone system.

FIG. 1 illustrates a block diagram of an embodiment microphone system 100 including a microphone 120, a current replicator 110, and a codec 130. In various embodiments, the microphone 120 receives acoustic signals and transduces the acoustic signals into electrical signals to supply to current replicator 110. Current replicator 110 produces a replica current to provide to codec 130 via impedance 140. In the embodiment shown in FIG. 1, only two wires are coupled between microphone 120 and a remainder of the system.

According to various embodiments, microphone 120 includes an acoustic transducing element 122 which may include a MEMS transducer element with a backplate and a membrane. In various embodiments, the acoustic transducing element 122 may include numerous transducer elements, MEMS transducer elements, and other transducers and MEMS transducers. Acoustic transducing element 122 may be made using microfabrication techniques and may be fabricated on a single die or on multiple dies.

In the embodiment shown in FIG. 1, acoustic transducing element 122 is coupled to an input of amplifier 124. Amplifier 124 is coupled to a power terminal VDD, an output terminal OUT, and a reference terminal VSS. Output terminal OUT may be coupled to reference terminal VSS via impedance 126, thereby making microphone 120 function as a two wire device. In such an embodiment, amplifier 124 drives output terminal OUT with a transduced voltage signal. The voltage signal may drive a current through impedance 126. Fluctuations in the current consumption at power terminal VDD are produced due to the current flowing through impedance 126. Such fluctuations can serve as an output signal at power terminal VDD proportional to a transduced signal from acoustic transducing element 122. In such embodiments, microphone 120 only uses reference terminal GND and power terminal VDD configured to sense fluctuations in current draw.

In some embodiments, microphone 120 may be implemented, for example, using circuitry described in U.S. patent application Ser. No. 13/941,273, filed on Jul. 12, 2013 and entitled "System and Method for a Microphone Amplifier," which is incorporated herein by reference in its entirety.

According to various embodiments, current replicator 110 is configured to sense fluctuations in current draw through power terminal VDD of microphone 120. As shown, power terminal VDD is coupled to terminal 1 of current replicator 110. Terminal 2 is coupled to codec inputs INP and INN and terminal 3 is coupled to supply voltage VDD_ext. In some embodiments, current replicator 110 is configured to maintain a constant or substantially constant voltage on terminal 1 while the current draw fluctuates. In an embodiment, current replicator 110 is configured to produces a replica current at terminal 2 that is equal or proportional to the current drawn from terminal 1. In a particular embodiment, a very small voltage drop is present between terminal 3 and terminal 1 of current replicator 110. A voltage at terminal 2 may swing between ground and a very small voltage drop below supply voltage VDD_ext. In some embodiments, current replicator 110 enables a large signal swing while maintaining a supply voltage to power terminal VDD via terminal 1.

In the embodiment shown in FIG. 1, the replicated current at terminal 2 is produced by current replicator 110 and flows through impedance 140. Codec 130 receives a voltage signal input from inputs INP and INN. Codec inputs INP and INN provide the voltage drop across impedance 140. In some embodiments, input INN may be coupled to ground GND, as shown. Codec 130 encodes the voltage signal input that is proportional to an original transduced signal from acoustic transducing element 122. Encoding may include amplifying and performing analog to digital conversion. As such, codec 130 may include an amplifier and an analog to digital converter (ADC).

Figure 2:
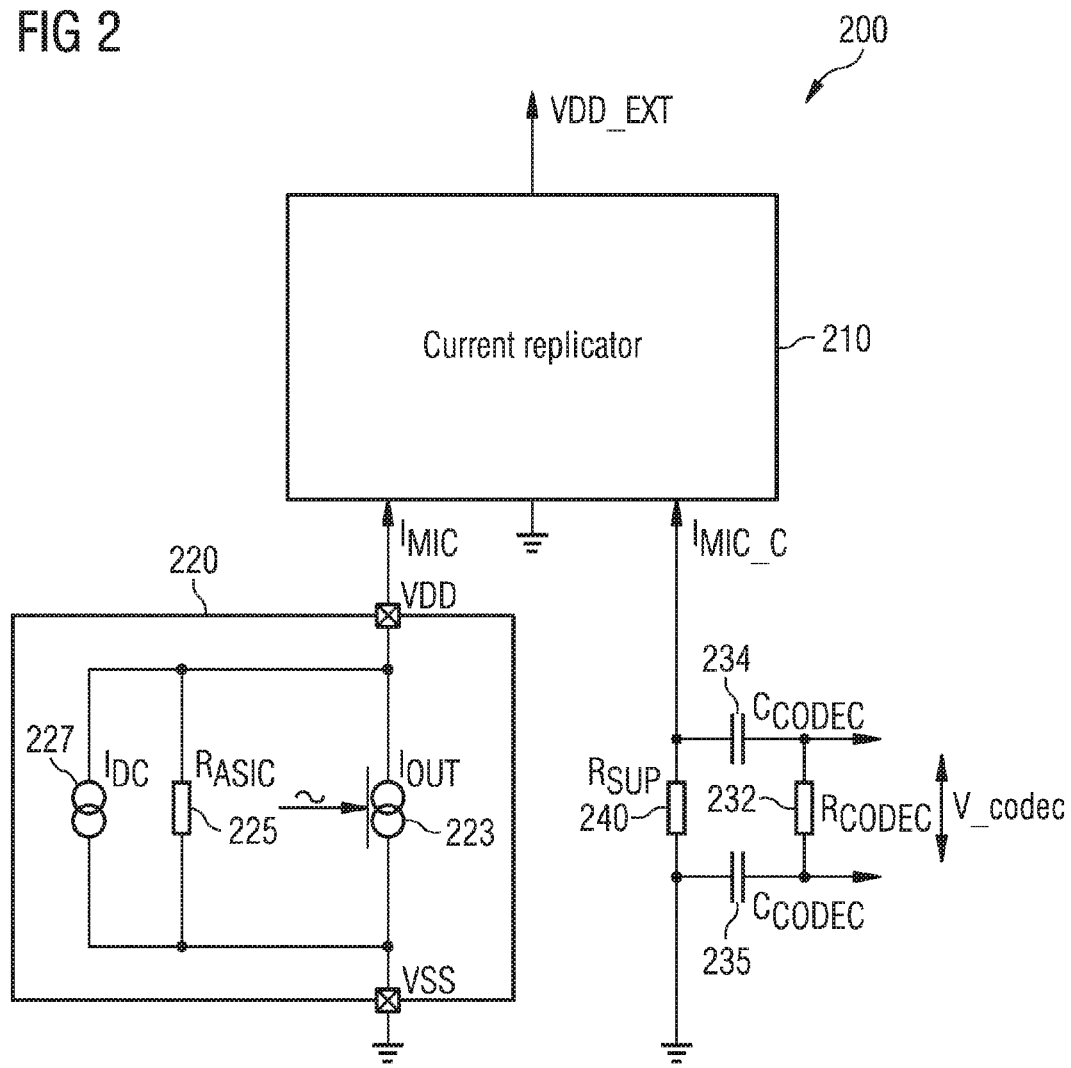
FIG. 2 illustrates a block diagram of an embodiment transducer system.

FIG. 2 illustrates a block diagram of an embodiment transducer system 200 including a transducer 220, a current replicator 210, and a codec interface. Transducer 220 is shown as a circuit model of a generic transducer comprising a variable current source 223. Coupled in parallel to the current source 223 are transducer resistance 225 and DC current source 227. In various embodiments, transducer 220 may include any type of transducer as is known in the art. In a specific embodiment, transducer 220 is a MEMS microphone.

As shown, current replicator 210 is coupled to transducer power terminal VDD and is configured to measure a current $I_{MIC}$ at power terminal VDD. In various embodiments, current replicator 210 may produce a replica current $I_{MIC\_C}$ proportional to, and in some cases equal to, current $I_{MIC}$. Replica current $I_{MIC\_C}$ may flow through resistor 240 in order to produce a voltage signal input at the codec input. In the embodiment shown, the codec interface is modeled as a resistive and capacitive interface by resistor 232 and capacitors 234 and 235.

Figure 3:
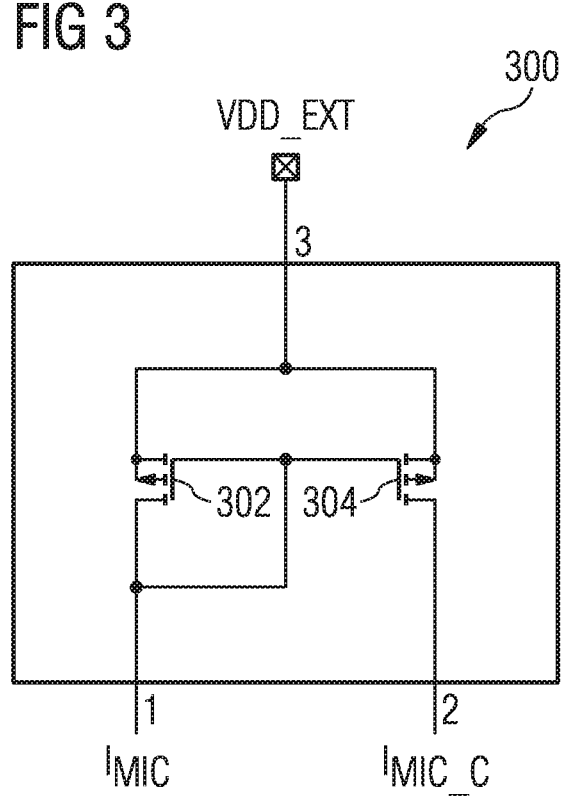
FIG. 3 illustrates a schematic of an embodiment current replicator.

FIG. 3 illustrates a schematic of an embodiment current replicator 300 including a first transistor 302 and a second transistor 304 configured as a current mirror. In various embodiments, transistors 302 and 304 are coupled to supply voltage VDD_EXT through terminal 3 and control terminals of transistors 302 and 304 may be coupled together. Transistor 302 may be configured to supply current $I_{MIC}$ to terminal 1 in order to maintain a substantially constant voltage on terminal 1. As shown, the control terminal of transistor 302 may be coupled to an output of transistor 302 at terminal 1. In various embodiments, transistor 304 may produce a replica current $I_{MIC\_C}$ proportional to current $I_{MIC}$. In some embodiments, the proportionality is given by the ratio between the sizes of transistors 302 and 304.

Figure 4:
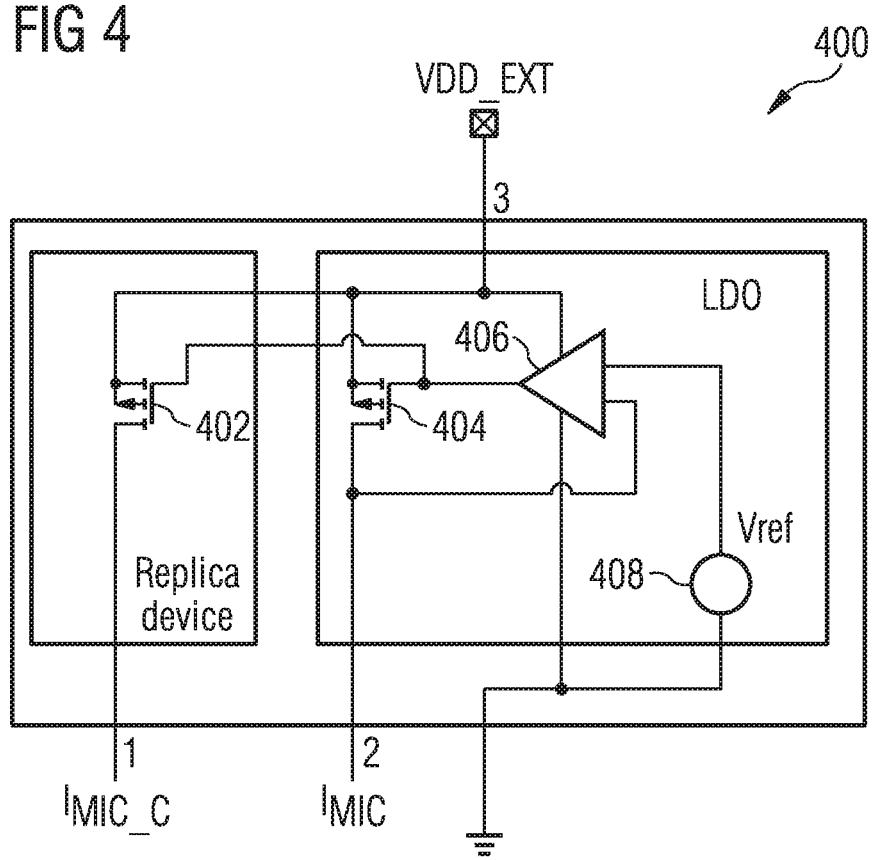
FIG. 4 illustrates a schematic of another embodiment current replicator.

FIG. 4 illustrates a schematic of another embodiment current replicator 400 including transistors 402 and 404, amplifier 406, and reference voltage source 408. In various embodiments, current replicator 400 is configured to maintain a substantially constant voltage on terminal 2 by varying the current $I_{MIC}$ flowing through transistor 404 while producing a proportional replica current $I_{MIC\_C}$ through transistor 402.

In the embodiment shown, transistor 402, transistor 404, and amplifier 406 have supply terminals coupled to supply voltage VDD_EXT via terminal 3. An output of amplifier 406 supplies control terminals of both transistors 402 and 404, which control terminals are coupled together. In such embodiments, replica current $I_{MIC\_C}$ is proportional to $I_{MIC}$ because both transistors 402 and 404 have the same supply voltage VDD_EXT and receive a same control signal from amplifier 406. As shown, transistor 404, amplifier 406, and reference voltage source 408 may together form a low-dropout regulator LDO.

According to various embodiments, amplifier 406 has a reference terminal coupled to a reference voltage, which is shown as a ground connection. Amplifier 406 may also have a first input coupled to reference voltage source 408 having a voltage Vref and a second input coupled to an output of transistor 404 at terminal 2. In various embodiments, voltage Vref may take on any value for biasing amplifier 406. In a particular embodiment, amplifier 406 functions to control transistor 404 in order to maintain a constant voltage on terminal 2. Specifically, amplifier 406 may function as a feedback amplifier for transistor 404 while simultaneously producing a proportional current in transistor 402.

In the embodiment shown in FIG. 4, amplifier 406 is depicted as an operational amplifier and transistors 402 and 404 are depicted as MOSFETs. In other embodiments, amplifier 406 may be implemented as any type of amplifier and may include multiple stages. Further, in alternative embodiments, transistors 402 and 404 may be implemented as any type of transistor and may include multiple transistors of a same size or multiple transistors with various different sizes. In this context, transistor size primarily refers to gate length and width of a transistor, but may also include other dimensions within a transistor. In reference to FIG. 3, numerous modifications to circuit arrangement and transistor types or sizes are also possible as is known in the art.

Figure 5:
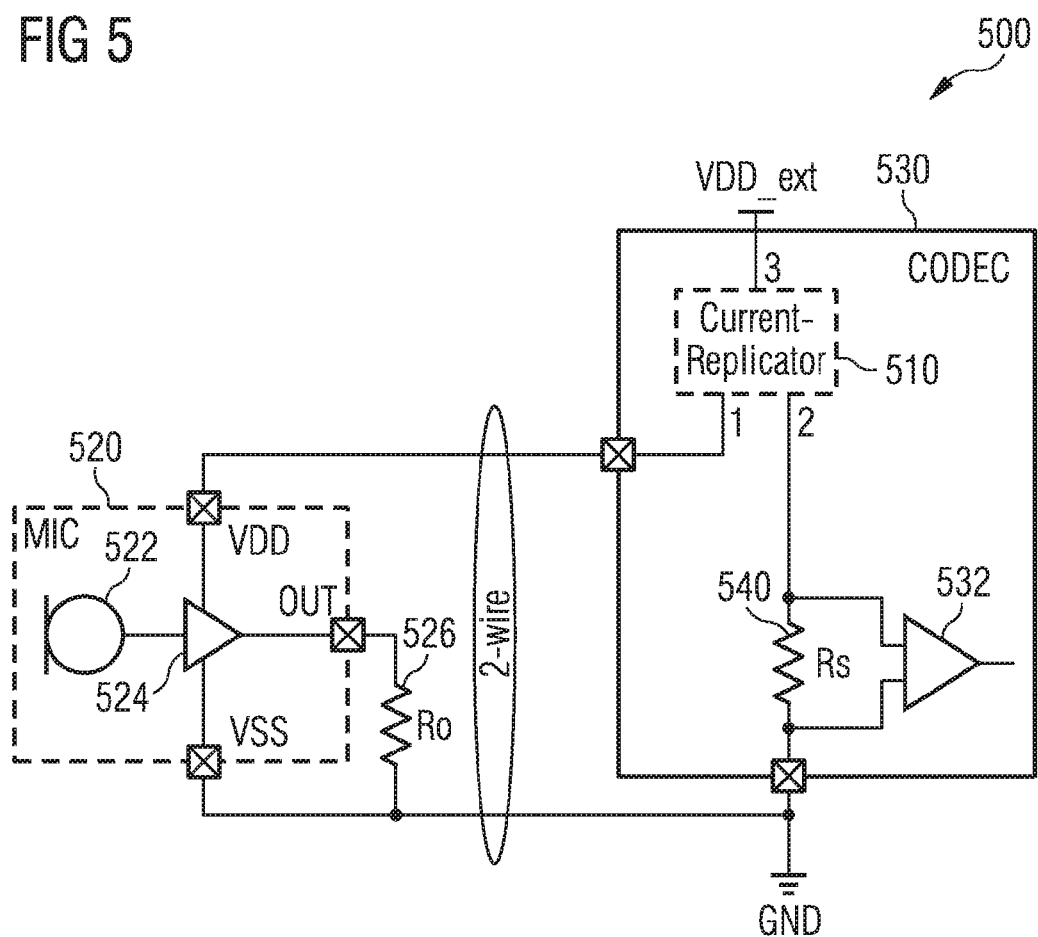
FIG. 5 illustrates a block diagram of another embodiment microphone system.

FIG. 5 illustrates a block diagram of another embodiment microphone system 500 including a microphone 520, a current replicator 510, and a codec 530, as described previously. As shown, in microphone system 500 codec 530 includes current replicator 510, impedance 540, and an amplifier 532. According to various embodiments, codec 530, current replicator 510, impedance 540, and amplifier 532 are fabricated on a same integrated circuit (IC). In other embodiments, codec 530, current replicator 510, resistor 540, and amplifier 532 include an integrated system and may not be fabricated on a same IC, but may be a number of separate dies bonded or packaged together as a system on a chip (SoC) or coupled to a common printed-circuit-board (PCB).

Figure 6:
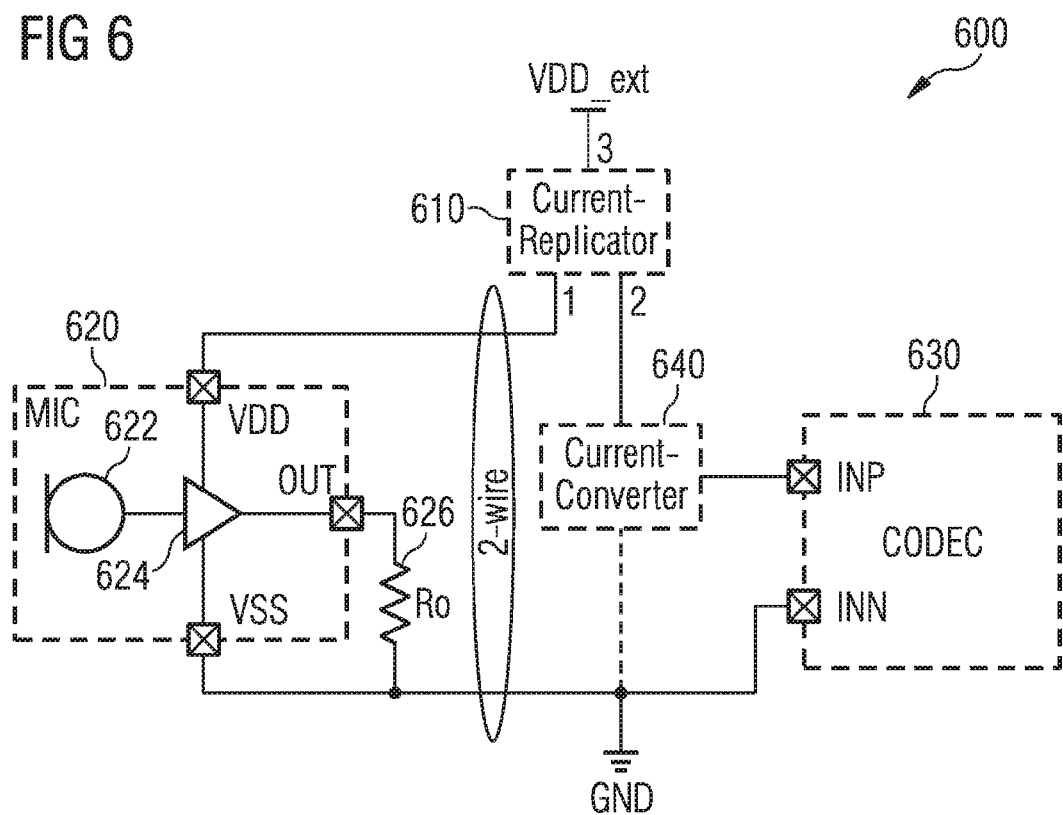
FIG. 6 illustrates a block diagram of a further embodiment microphone system.

FIG. 6 illustrates a block diagram of a further embodiment microphone system 600 including a microphone 620, a current replicator 610, a codec 630, and a current converter circuit 640. According to various embodiments, microphone 620, current replicator 610, and codec 630 function as described previously with reference to the other figures. Current converter circuit 640 is coupled between terminal 2 of current replicator 610 and input terminal INP of codec 630. In various embodiments, current converter circuit may also be coupled to a reference terminal GND as shown.

According to various embodiments, current converter circuit 640 may convert a replica current from current replicator 610 that is proportional to a current produced by microphone 620 into a voltage signal. The converted voltage signal from current converter circuit 640 may be supplied to the input INP to codec 630. Current converter circuit 640 may include an impedance. In some specific embodiments, current converter circuit 640 may include resistors, capacitors, inductors, or any combination thereof. Current converter 640 may also include various active components, such as diode, amplifiers, and/or transistors. In a further specific embodiment, current converter circuit 640 includes a transimpedance amplifier (TIA) having an input coupled to terminal 2 of current replicator 610 and an output coupled to input INP of codec 630. In such an embodiment, the TIA may have a reference node coupled to the ground terminal GND. Further, current converter circuit 640 may include any combination of active and passive components.

According to various embodiments, current converter circuit 640 may be used in any of the embodiments described herein. Further, all the embodiment components, including transducers, microphones, current replicators, current converter circuits, and codecs may be interchanged freely between the embodiments described in the figures.

FIG. 7 illustrates a block diagram of an embodiment method of operation 700 including steps 702 through 714. According to various embodiments, step 702 includes receiving power at an interface circuit on a power supply terminal. Step 704 includes providing the received power to a transducer through a transducer terminal via the interface circuit. Step 706 includes receiving a transduced signal from the transducer terminal. In various embodiments, the transduced signal is proportional to a physical signal incident on the transducer. In a specific embodiment, the transduced signal is proportional to an acoustic signal received by a microphone that produces the transduced signal. Power may be supplied to the transducer through a transducer terminal and a transduced signal may be received from the transducer through the same transducer terminal.

According to further embodiments, step 708 includes providing a current signal proportional to the transduced signal to a current converter circuit. Step 710 includes converting the current signal to a voltage signal via the current converter circuit, and step 712 includes providing the voltage signal to a codec. Finally, step 714 may include providing a reference supply to the codec. In various embodiments, the reference supply may be a ground connection.

According to an embodiment, an interface circuit includes a current replicator and a receiver. The current replicator includes a power terminal coupled to a first reference node, an output terminal configured to output a signal proportional to a signal received from a transducer, and an interface terminal coupled to the transducer. Using a single interface terminal, the current replicator may be configured to provide power to the transducer and receive output signals from the transducer. The receiver may include a first input terminal coupled to the output terminal, a second input terminal coupled to a second reference node, and a current converter circuit coupled to the first input terminal.

In various embodiments, the receiver further includes a codec configured to encode analog signals and coupled to the current converter circuit. The current replicator and the receiver may be disposed on a same integrated circuit. The current replicator and the receiver may also be disposed on two different integrated circuits. In some embodiments, the current replicator and the receiver may include discrete components. The interface circuit may also include the transducer, and the transducer may be coupled to the interface terminal and the second reference node. The transducer may be implemented as a microphone. In such an embodiment, the microphone may be a microelectromechanical systems (MEMS) microphone. In some embodiments, the current converter circuit is further coupled to the second reference node.

In various embodiments, the current replicator includes a first transistor, a second transistor, and a differential amplifier. The first transistor may have a control terminal, a first conduction terminal coupled to the power terminal, and a second conduction terminal coupled to the output terminal. The second transistor may have a control terminal, a first conduction terminal coupled to the power terminal, and a second conduction terminal coupled to the interface terminal. In some embodiments, the control terminal of the second transistor is coupled to the control terminal of the first transistor. The differential amplifier may have an output coupled to the control terminals of the first and second transistors, a first input coupled to a reference voltage, and a second input coupled to the second conduction terminal of the second transistor. In some embodiments, the first transistor, the second transistor, and the amplifier are configured to maintain a substantially constant voltage at the second conduction terminal of the second transistor and replicate the current flowing from the first conduction terminal to the second conduction terminal of the second transistor in the current flowing from the first conduction terminal to the second conduction terminal of the first transistor.

According to an embodiment, a method of operating an interface circuit includes providing power to a transducer on a first line, receiving a transduced signal from a transducer on the first line, and providing a current signal proportional to the transduced signal to a current converter circuit. In such an embodiment, the transduced signal is proportional to a physical signal received by the transducer. The method of operating an interface circuit may further include converting the current signal to a voltage signal at the current converter circuit, providing the voltage signal to a codec, and providing a reference supply to the codec. In an embodiment, the method also includes maintaining a voltage level on the first line at a constant voltage level.

According to an embodiment, a microphone system includes a microphone, a current replicator, a current converter circuit coupled between a second terminal and a first reference node, and a codec coupled to the current converter circuit. In various embodiments, the microphone includes an output terminal and a reference terminal, the reference terminal may be coupled to the first reference node, and the microphone is configured to receive power from the output terminal. Further, the current replicator may include a first transistor with a conduction path coupled between a first terminal and a second reference node, and a second transistor with a conduction path coupled between a second terminal and the second reference node. The single output terminal may be coupled to the first terminal.

In various embodiments, the current converter may include an impedance coupled between the second terminal and the first reference node, and the codec may be coupled to the second terminal. The impedance may include resistive and/or capacitive elements. In other embodiments, the current converter may include a transimpedance amplifier having an input coupled to the second terminal and an output coupled to the codec. The microphone may be implemented as a microelectromechanical systems (MEMS) microphone.

In various embodiments, the microphone and the codec may be disposed on two different integrated circuits. The current replicator may be disposed on a same integrated circuit as the codec. In some embodiments, a control terminal of the first transistor may be coupled to a control terminal of the second transistor. The current replicator may also include an amplifier having an output coupled to the control terminals of the first and second transistors. An amplifier coupled to the current converter circuit may also be included in the codec.

Advantages of various embodiments described herein may include increased transducer voltage swing at a supply and sense interface terminal caused by a low voltage drop interface circuit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A transducer system comprising:
a transducer;
an amplifier comprising a power supply terminal, a signal input terminal coupled to the transducer, and a signal output terminal; and
a current replicator coupled to the power supply terminal and not to the signal output terminal, the current replicator configured to
receive a current draw signal from the power supply terminal, and
generate a current output signal based on the current draw signal, wherein the current output signal is proportional to a physical signal received by the transducer.

2. The transducer system of claim 1, further comprising a current converter circuit coupled to the current replicator and configured to convert the current output signal to a voltage output signal.

3. The transducer system of claim 2, wherein the current converter circuit consists of passive circuit components.

4. The transducer system of claim 2, wherein the current converter circuit comprises active circuit components.

5. The transducer system of claim 4, wherein the active circuit components comprise a transimpedance amplifier.

6. The transducer system of claim 1, wherein the current replicator comprises:
a power terminal configured to be coupled to a first reference node;
an output terminal configured to output the current output signal;
an interface terminal configured to receive the current draw signal from the power supply terminal;
a first transistor having a control terminal, a first conduction terminal coupled to the power terminal, and a second conduction terminal coupled to the output terminal;
a second transistor having a control terminal, a first conduction terminal coupled to the power terminal, and a second conduction terminal coupled to the interface terminal, wherein the control terminal of the second transistor is coupled to the control terminal of the first transistor; and
a differential amplifier having an output coupled to the control terminals of the first and second transistors, a first input coupled to a reference voltage node, and a second input coupled to the second conduction terminal of the second transistor.

7. The transducer system of claim 6, wherein the first transistor, the second transistor, and the differential amplifier are configured to maintain a substantially constant voltage at the second conduction terminal of the second transistor and replicate the current flowing from the first conduction terminal to the second conduction terminal of the second transistor in the current flowing from the first conduction terminal to the second conduction terminal of the first transistor.

8. The transducer system of claim 1, wherein the transducer comprises a microphone.

9. The transducer system of claim 8, wherein the microphone comprises a microelectromechanical systems (MEMS) microphone.

10. The transducer system of claim 9, further comprising a codec coupled to the current replicator and configured to receive the current output signal.

11. The transducer system of claim 1, wherein the transducer and the amplifier are disposed on a first integrated circuit die and the current replicator is disposed on a second integrated circuit die, the first integrated circuit die being separate from the second integrated circuit die.

12. The transducer system of claim 1, wherein the signal output terminal and a reference supply terminal are coupled to a ground node.

13. The transducer system of claim 12, further comprising a resistive element having a first terminal and a second terminal, the second terminal directly connected to the ground node, wherein the reference supply terminal is directly connected to the ground node and the signal output terminal is directly connected to the first terminal of the resistive element.

14. A method of operating a transducer system, the method comprising:
receiving a physical signal at a transducer;
generating a transduced signal at the transducer based on the physical signal;
supplying the transduced signal to a signal input terminal of an amplifier, the amplifier comprising the signal input terminal, a signal output terminal, and a power supply terminal;
generating a current draw signal at the power supply terminal;
receiving the current draw signal at a current replicator, the current replicator not being coupled to the signal output terminal;
generating a current output signal based on the current draw signal in the current replicator, wherein the current output signal is proportional to the physical signal; and
providing the current output signal at an output of the current replicator.

15. The method of claim 14, further comprising converting the current output signal to a voltage output signal using a current converter circuit coupled to the output of the current replicator, the current converter circuit comprising active circuit components.

16. The method of claim 14, wherein receiving the current draw signal at the current replicator comprises maintaining a substantially constant voltage at the power supply terminal.

17. The method of claim 16, wherein generating the current output signal based on the current draw signal comprises replicating the current draw signal in the current output signal.

18. The method of claim 14, wherein receiving the physical signal at the transducer comprises receiving an acoustic signal at a microphone.

19. The method of claim 14, further comprising providing the current output signal to a codec coupled to the output of the current replicator.

20. The method of claim 19, wherein providing the current output signal to the codec comprises:
converting the current output signal to a voltage output signal at a current converter circuit coupled to the output of the current replicator; and
providing the voltage output signal from the current converter circuit to the codec.

21. A transducer system comprising:
a first integrated circuit die comprising:
a first interface pin,
a second interface pin coupled to a first reference voltage node,
a microelectromechanical systems (MEMS) transducer, and
an amplifier comprising a power supply terminal coupled to the first interface pin, a signal input terminal coupled to the MEMS transducer, and a signal output terminal coupled to the second interface pin; and
a second integrated circuit die comprising:
a current interface pin coupled to the first interface pin, and
a current mirror coupled to the current interface pin, the current mirror configured to receive a current draw signal from the power supply terminal through the current interface pin, and supply a current output signal to an output node, wherein the current output signal mirrors the current draw signal and is proportional to a physical signal received by the MEMS transducer.

22. The transducer system of claim 21, wherein the second integrated circuit die further comprises a current converter circuit coupled to the output node and configured to convert the current output signal to a voltage output signal.

23. The transducer system of claim 22, wherein the current converter circuit comprises active circuit components.

24. The transducer system of claim 23, wherein the active circuit components comprise a transimpedance amplifier.

25. The transducer system of claim 21, wherein the second integrated circuit die further comprises a codec coupled to the output node.

26. The transducer system of claim 21, wherein the current mirror comprises:
a first transistor having a control terminal, a first conduction terminal coupled to a supply voltage node, and a second conduction terminal coupled to the output node;
a second transistor having a control terminal, a first conduction terminal coupled to the supply voltage node, and a second conduction terminal coupled to the current interface pin, wherein the control terminal of the second transistor is coupled to the control terminal of the first transistor; and
a differential amplifier having an output coupled to the control terminals of the first and second transistors, a first input coupled to a second reference voltage node, and a second input coupled to the second conduction terminal of the second transistor.

27. The transducer system of claim 21, wherein
the first integrated circuit die further comprises a third interface pin coupled to the first reference voltage node, wherein the second interface pin is coupled to the first reference voltage node through a resistor; and
the amplifier further comprises a reference supply terminal coupled to the third interface pin.

28. The transducer system of claim 21, wherein the MEMS transducer comprises a MEMS microphone.

* * * * *